No. 859,462. PATENTED JULY 9, 1907.
F. H. RICHARDS.
MECHANICAL MOVEMENT.
APPLICATION FILED JULY 24, 1902.

Witnesses:
C. A. Jarvis.
A. C. Abbott.

Inventor:
F. H. Richards.

No. 859,462. PATENTED JULY 9, 1907.
F. H. RICHARDS.
MECHANICAL MOVEMENT.
APPLICATION FILED JULY 24, 1902.

Witnesses:
C. A. Jarvis.
A. C. Abbott

Inventor:
F. H. Richards

No. 859,462. PATENTED JULY 9, 1907.
F. H. RICHARDS.
MECHANICAL MOVEMENT.
APPLICATION FILED JULY 24, 1902.

Witnesses:
C. A. Jarvis.
O. C. Abbott

Inventor:
F. H. Richards.

No. 859,462. PATENTED JULY 9, 1907.
F. H. RICHARDS.
MECHANICAL MOVEMENT.
APPLICATION FILED JULY 24, 1902.

Witnesses:

Inventor:

No. 859,462. PATENTED JULY 9, 1907.
F. H. RICHARDS.
MECHANICAL MOVEMENT.
APPLICATION FILED JULY 24, 1902.

Witnesses:
C. A. Jarvis.
H. C. Abbott.

Inventor;
F. H. Richards.

UNITED STATES PATENT OFFICE.

FRANCIS H. RICHARDS, OF HARTFORD, CONNECTICUT.

MECHANICAL MOVEMENT.

No. 859,462.  Specification of Letters Patent.  Patented July 9, 1907.

Application filed July 24, 1902. Serial No. 116,759.

*To all whom it may concern:*

Be it known that I, FRANCIS H. RICHARDS, a citizen of the United States, residing at Hartford, in the county of Hartford and State of Connecticut, have invented certain new and useful Improvements in Mechanical Movements, of which the following is a specification.

My present invention pertains to mechanical movements, and one of the objects of the same is to provide a mechanical device or organization of devices capable of modifying movements imparted to the same, to attain a circumferential movement of an angularly movable member corresponding with the movements of an angularly movable member as measured upon the diameter of the circle it would describe.

Another object of this invention is to provide a mechanical organization in which motion will be imparted from a driver to a continuously advancing member and also to an advancing and retreating member to effect corresponding movements of said members during an appreciable period in the advance of the advancing and retreating member.

The novel principles involved in this invention are applicable to innumerable phases of machine construction and organization, wherein it is desired to utilize the circumferential and diametral movements of angularly movable members and produce coincident movements therein, whether accompanying or opposing movements are desired, and the specific objects applying to the different applications of the principle would therefore multiply accordingly.

My invention consists in so organizing mechanical elements as to produce a device, wherein the circumferential movement, or in other words, the development of an angularly movable member is caused to correspond to the diametral or projected movement of an angularly movable member operatively connected to said first member during an appreciable period in the cycle of the initial mover and also consists in the application of the principles involved and the combination and organization of elements hereinafter described and claimed.

This principle may be utilized to effect a travel of instrumentalities with a continuously advancing member during the operation of such instrumentalities with relation to said member and thus effect a fixed relation between said instrumentalities and said member during the operation of said instrumentalities, and repeat said fixed relation at successive periods in the advance of the continuously advancing member effecting the said fixed relation between said instrumentalities and said member at successive points upon said member without affecting the continuity of the advance of said continuously advancing member; for instance, a fixed relation may be successively effected at successive points between said continuously advancing member and a pointer, stylus or tool transversely traversable of said continuously advancing member and maintained during the period of said traverse so that successive straight lines or cuts or figures of predetermined configuration may be made upon said continuously advancing member or in connection therewith successively without stopping the same.

A few instances of the application of the principle involved in my invention may be pointed out as follows; a cut-off saw may be carried with advancing stock during the operation of said saw upon the stock at successive points; boring tools may be caused to travel with continuously advancing stock during their operation upon the stock and return to repeat said travel and operation at a succeeding point on said stock; carving machine tools may be caused to travel with advancing molding stock during the time they are in the profile of the stock and carried back to repeat the operation at other points upon the stock, etc.

A further object of this invention is to provide in combination with such a continuously advancing member and an advancing and retreating member having a movement corresponding with that of said continuously advancing member at successive periods in the cycle at successive points upon the continuously advancing member, of means for causing the greater portion of the movement imparted to the instrumentalities, such as tools, stylus, pointers, etc., which may comprise the advancing and retreating member or be carried thereby to occur during the said corresponding movements and the lesser part of the movements of said tools, etc., during their return movements, all of which, to the end that an even distribution of power may be attained.

Applicant is aware that an advancing and retreating member has been caused to travel with a continuously advancing member at successive periods, by organizations wherein the diametral movements of the driving crank have been corrected or augmented to correspond with the uniform movement of a continuously advancing member by means of superimposed auxiliary members such as cams, etc., and that the same has been accomplished through the use of irregular gearing, but aims to improve upon such constructions by providing a practical organization in which the power applied is more evenly distributed between the several parts with regard to the work to be done.

I have illustrated an organization comprising a mechanical movement involving the principles of this invention, in the accompanying drawings in which like reference characters denote like parts throughout the several views.

The feature of the concurrence of motion of the variable linearly moving member and the member reciprocatory in a parallel path is claimed in my co-pending application, Serial No. 119,045 and certain other features which are illustrated to some extent in this present application are claimed in my co-pending application Serial No. 116,758.

Fig. 6ª is a sectional elevation similar to Fig. 6 but at right angles thereto.

Referring to the drawings, I will describe in detail the mechanism shown which is one of the forms which the principle involved in this invention may take, and is merely illustrative of said principle.

The device is mounted upon a base 2, a driving shaft 3 is mounted in bearings 4, upstanding from the base 2. The driving shaft 3, is provided with a crank 5 and a handle 6 for rotating the same. Upon the end of the driving shaft 3, opposite the crank 5, is mounted a crank 7, having a wrist-pin 8. The wrist-pin 8 of the crank 7 engages a slotted crank 9, fast on a shaft 10 mounted eccentrically of the driving shaft 3 in bearings 11 upstanding from the base 2. Upon the rotation of the driving shaft 3 by the handle 6, the wrist-pin 8 of crank 7 will drive the shaft 10 through the slotted crank 9 at varying velocities throughout the rotation of the driving shaft 3. A gear 12 is mounted fast on the shaft 10 and meshes with a larger gear 13, fast on a shaft 14 mounted in bearings 15 upstanding from the base 2. Fast upon the shaft 14 is mounted a pulley 16 which carries and drives a belt 17, passing over a pulley 18 on a shaft 19, mounted in bearings 20 upstanding from the base 2. It will be seen that the uniform rotation of driving shaft 3 will be transmitted to the shaft 10 as a continuing rotation of varying velocity, and that said continuous rotation of varying velocity will be imparted to the pulley 16 through the gears 12 and 13. The pulley 16 drives a belt 17 and the upper reach of the belt 17 will be given a continuously advancing movement at varying velocities. The advancing movement of the upper reach of the belt 17 will be the circumferential development of the pulley 16 and hence the development of a circle described by some radius taken on the shaft 14.

A spiral gear 21 is mounted fast upon the driving shaft 3, and meshes with the spiral gear 22 of like pitch and diameter, mounted upon a stud 23 at right angles to the shaft 3. The spiral gear 22 is driven at the same speed as the driving shaft 3. A crank 24 projects from the hub of the spiral gear 22 and carries a wrist-pin 25, the radius of the path of the wrist-pin 25 being the same as the radius of the path of the wrist-pin 8 on crank pin 7. The wrist-pin 25 engages a slotted crank 26 mounted upon a pivot 27, which pivot 27 is rigid with the stud 23 and has the same eccentricity with the latter as the shaft 10 has with the driving shaft 3. Therefore, it will be seen that the crank 26 will be driven at like velocities and with the same variation of velocity as the shaft 10.

Figure 1:
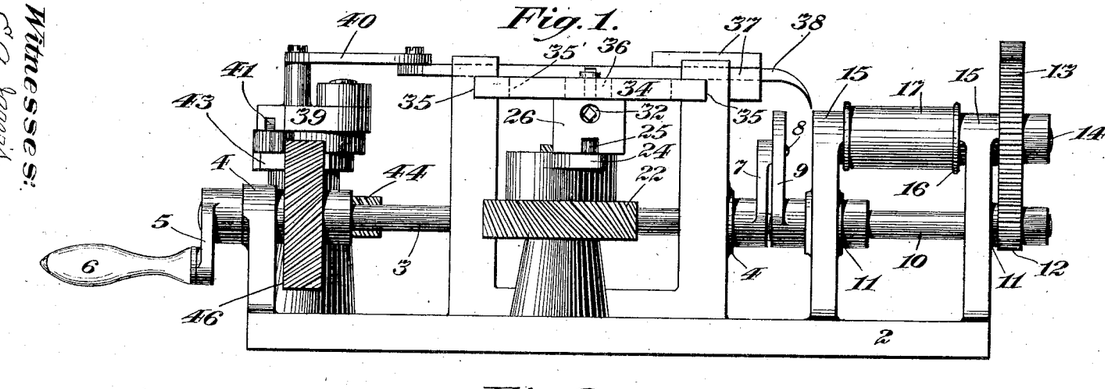
Figure 1, is a right side elevation.
Figure 2:
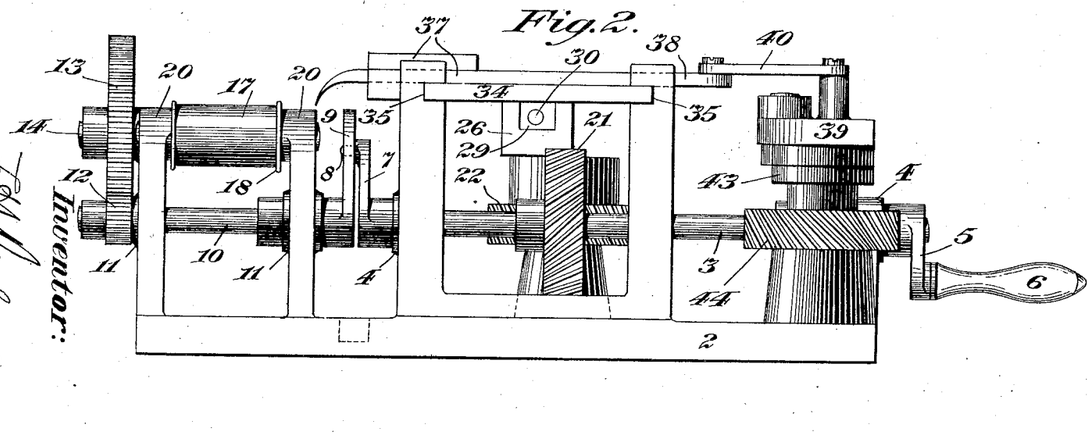
Fig. 2, a left-side elevation.
Figure 3:
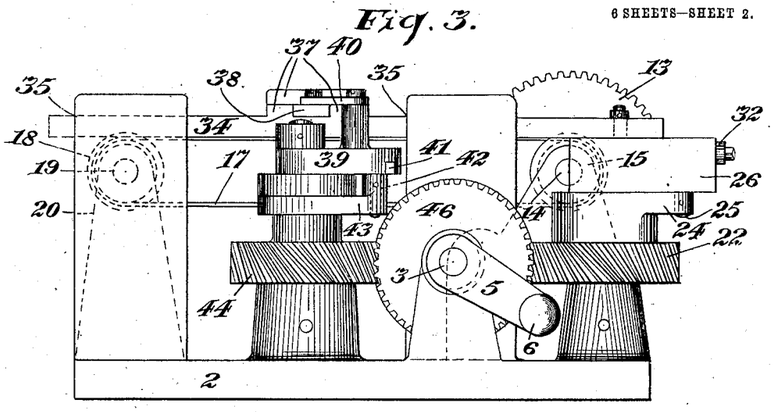
Fig. 3, a front elevation.
Figure 4:
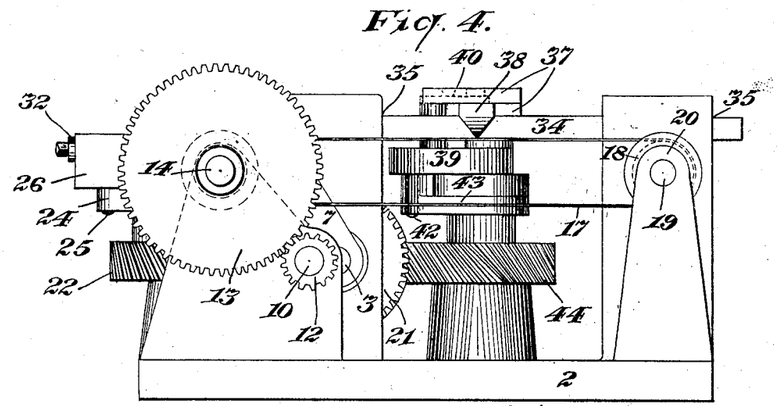
Fig. 4, a rear elevation.
Figure 5:
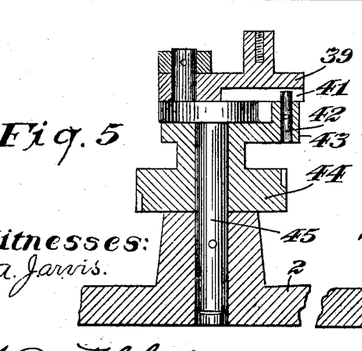
Fig. 5, a vertical section of the pointer driving variable gear.

The spiral gears 21 and 22 are set in mesh so that the wrist-pin 8 of crank 7 will be passing downward (see Fig. 1) at the same time that the wrist-pin 30′ of the crank 26 is passing from right to left in slot 35′.

The crank 26 is provided with a slot 28 in its upper surface in which a block 29 is adapted to be adjusted longitudinally of said crank 26, the block 29 has a longitudinally threaded hole therein through which passes a screw 30, fixed against longitudinal movement by a collar 31 thereon, and a head 32 embracing an abutment 33 in said slot 28. The block 29 may be adjusted longitudinally of the slot 28 by the rotation of the screw 30. The block 29 carries a wrist-pin 30′ which constitutes with the adjusting means and the crank body 26 a crank centered upon the pivot 27. A carrier 34 is mounted in guideways 35, upstanding from the base 2, to slide parallelly of the belt 17, and said carrier 34 is provided with a transverse slot 35′ in which a block 36 is adapted to slide, the block is provided with a bearing in which the wrist-pin 30′ of the adjustable crank 26 is journaled. The slot 35′ constitutes a yoke in which the wrist-pin 30′, guided by the block 36 is adapted to work. Upon the rotation of the driving shaft 3, the crank 26 driven at varying velocities as already described will through the wrist-pin 30 and the yoke connection just described reciprocate the carrier 34 parallelly of the belt 17.

Figure 8:
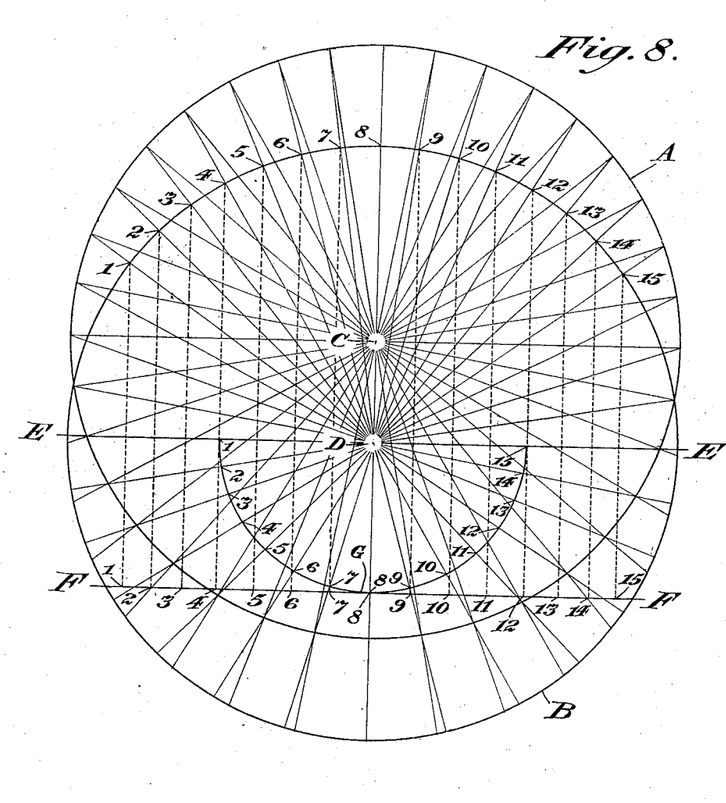
Fig. 8, a diagram of the speed varying connection.

To attain the object of this particular device as shown, it is desired to so set the speed varying transmitting devices consisting of the connected cranks 7 and 9 and the connected cranks 24 and 26 that the travel of the carrier 34 in the direction of the travel of the upper reach of the belt 17 will correspond with the travel of the upper reach of the belt 17 during an appreciable period in the travel of the carrier 34 in said direction. Referring to Fig. 8 I will show in what manner the said speed varying transmitting device may be set to effect the desired result. In this diagram the circle A represents the path of travel of the wrist-pin of the driving crank of one of said speed varying transmitting devices, and said circle A is divided into 36 equal divisions representing the consecutive positions of the wrist-pin at each 10 degrees of revolution of the driving shaft. The lines connecting these divisions with the center C of the circle A, represent the driving crank carrying said wrist-pin. The circle B represents the path of the point upon the slotted crank or driven crank having the same radius as the wrist-pin upon the driver. The center of the circle B is indicated at D. When the wrist-pin of the driving crank engages the slot of the driven crank the point of intersection of the driving and driven cranks will always be the wrist-pin on the driving crank; therefore, the consecutive positions of the driven or slotted cranks are indicated by lines drawn from the center D of the driven crank to the points upon the circle A. The reciprocating motion of the carrier 34 is effected by the embracement of the crank upon the driven member of the speed varying transmitting device by the yoke or slot 35′. Therefore, the movement taken upon the carrier 34 is the diametral movement of the said crank or the movement of said crank measured upon the diameter of the circle described by its wrist-pin. Hence I have indicated said movement by the line E, E, which is the diameter of the circle B, representing the travel of the driven member. The consecutive positions assumed by the carrier 34 at each 10 degrees of the revolution of the driver are represented upon the line E, E, by projecting the points where the lines radiating from the center D cross he circle B, indicated in diagram by dotted perpendiculars dropped upon the line E, E.

I find that a member having the center D and a radius describing the circumference G will when rotated at the varying velocities which are given the driven member indicated by the circle B, when developed upon a line parallel to the diameter E, E, such line being indicated at F, F, correspond extremely closely, if not exactly with the diametral movement upon the line E, E, that is, if a member be moved diametrally of the driven member as is the case with the carrier 34, and another member be moved by a roll the circumference of which will be the circle G, and the latter member being engaged by the roll G in the same manner as the line F, F, with the said latter member would move the first-mentioned member at the said velocities throughout 140 degrees more or less, when the proportions are those shown in the diagram, of the revolution of the driver. The exactitude of these coincident movements is immaterial so far as mathematical correctness is concerned in the present machine, as it suffices that the coincidence is so nearly perfect that in the application of the principle to machinery a few thousandths of an inch in error are imperceptible.

It is deemed unnecessary in the present patent application to enlarge upon the mathematical course pursued in obtaining the proportions and distances, but it may be said that the radii of the circles A and B are between 3 and pi times the eccentricity of the centers C and D and the radius of the circle G is half the radius of the circle A. These proportions give this close coincidence of movement through 180 degrees in the revolution of the driven member and serve the purpose of illustrating the principle applied. It will be seen that the projections are taken from the upper side of the circle B or from that side of the circle B indicating the slower movement of the driven crank, while the development upon the circle G is taken upon the lower side or that side indicating the faster velocities. This feature necessitates the movements of the driving cranks in the directions as noted in the description of the device above.

Upon the carrier 34 are provided guides 37 in which a pointer 38 is mounted to slide transversely of the carrier 34. The pointer 38 is connected with a crank 39 by a link 40 and the crank 39 is provided with a slot 41 engaged by the wrist-pin 42 of a crank 43 set eccentric to the crank 39 and mounted upon a spiral gear 44, mounted upon a stud 45 upstanding from the base 2. A crank 39 is shown as mounted upon a pivot 99 rigid with the stud 45.

Figure 7:
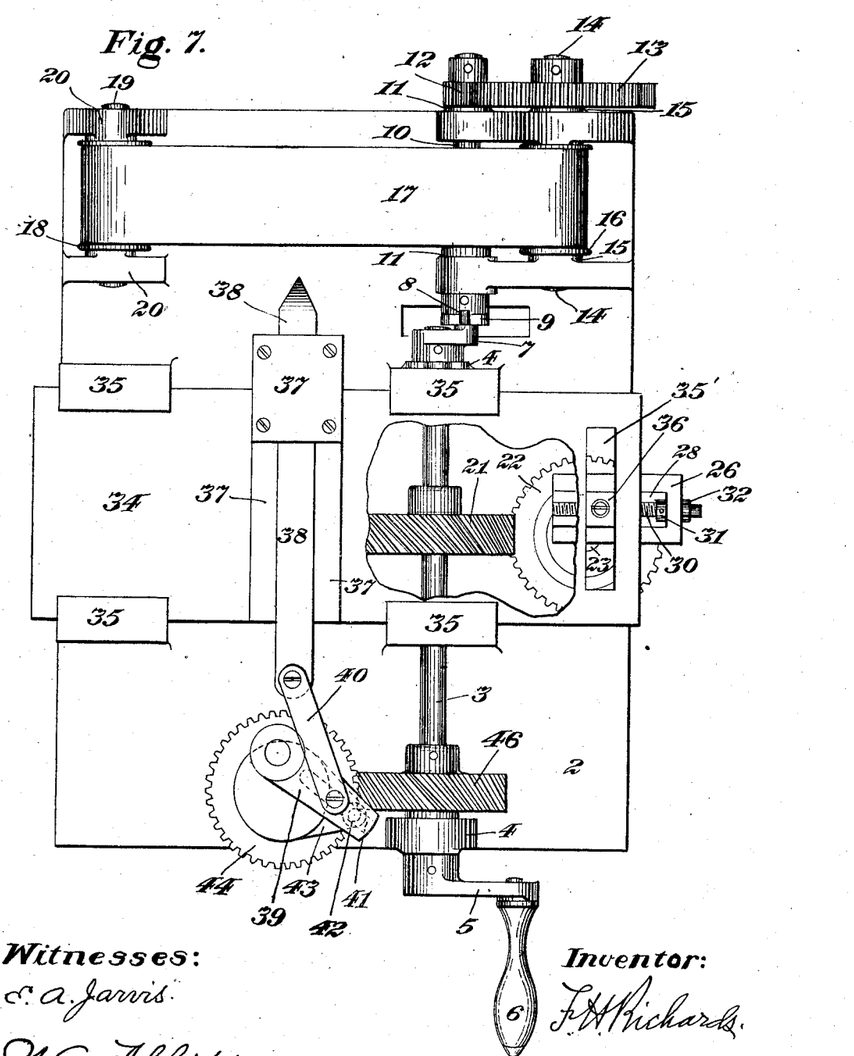
Fig. 7, a plan view.

It will be noted that the carrier 34 travels from right to left (see Fig. 7) as the crank 39 travels from right to left through the half of its path nearest the pointer. This arrangement produces a short amount of travel of the pointer during the period of non-coincidence of the movements of the carrier and belt and is very desirable. The spiral gear 44 meshes with the spiral gear 46, fast on the driving shaft 3. Upon the rotation of the spiral gear 44, crank 39 will be driven at varying velocities and the centers of the cranks 39 and 43 are so positioned that the faster movements of the crank 39 will occur upon that side of its center nearer the pointer 38, and therefore drive the pointer 38 forward and return a greater distance in one half revolution of the spiral gear 44 than during the other half. The spiral gears 44 and 22 are mounted in such positions that this greater travel of the pointer will take place during the travel of the carrier 34 with the upper reach of the belt 17.

By noting the above description of the connections, it will be seen that the pointer 38 will travel forward across the belt 17 and back again during the movement of the carrier 34 with the belt 17, thereby describing a straight line upon the upper reach of the belt 17, reaching and leaving the belt during each 140 degrees more or less in the rotation of the driving shaft 3. During the remainer of the revolution of the driving shaft 3, the pointer has left the belt and reaches the same again when the coincidence is again attained. To cause the pointer to travel a greater distance in describing the straight line upon the belt than its travel when away from the belt, I have interposed the variable transmitting device driven by spiral gear 44, the reason for said particular arrangement being apparent in the application of this movement in machinery wherein it may be employed. Again it may be desired while maintaining the faster movement of the pointer during the describing of the straight line upon the belt to cause the withdrawal of the pointer in making said straight line to be at a greater speed than its advance, and this I accomplish by setting the centers of the cranks 39 and 43 inclinedly from the course of the pointer as indicated in the diagram illustrated in Figs. 9 and 10, where the path of movement of the pointer and the successive positions assumed thereby are shown in the lower portions of each of the diagrams.

In the device as described the straight lines described by the pointer 38 upon the belt 17, will occur at equal intervals upon said belt. If it is desired to change the distance between the said straight lines upon the continuously advancing member, in this case the belt, I attain such a result by changing the gears 12 and 13, which are made as change gears and adjust the radius of the adjustable crank 26 by rotating one way or the other the screw 30 to suit the conditions altered by the change of gears. This merely alters the distance traveled by the belt in one revolution of the driver and makes the corresponding alteration in the speed and travel of the carrier 34 without destroying the coincidence of the varying movements and effects the result desired, that is, the change in distance between the lines described upon the continuously advancing member. The proportions of the change in radius of the crank 26 with the change gears can be mathematically ascertained with reference to any particular machine made, or the change of gears may be calculated and the crank 26 adjusted until the carrier will have the desired movement.

Figure 6:
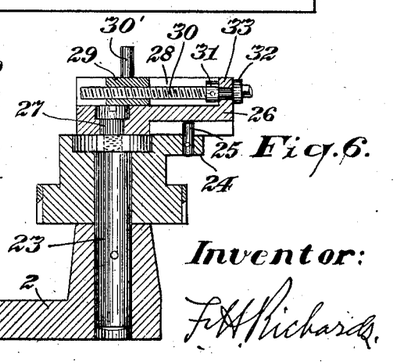
Fig. 6, a vertical section of the carrier driving variable gear.
Figures 6A, 10:
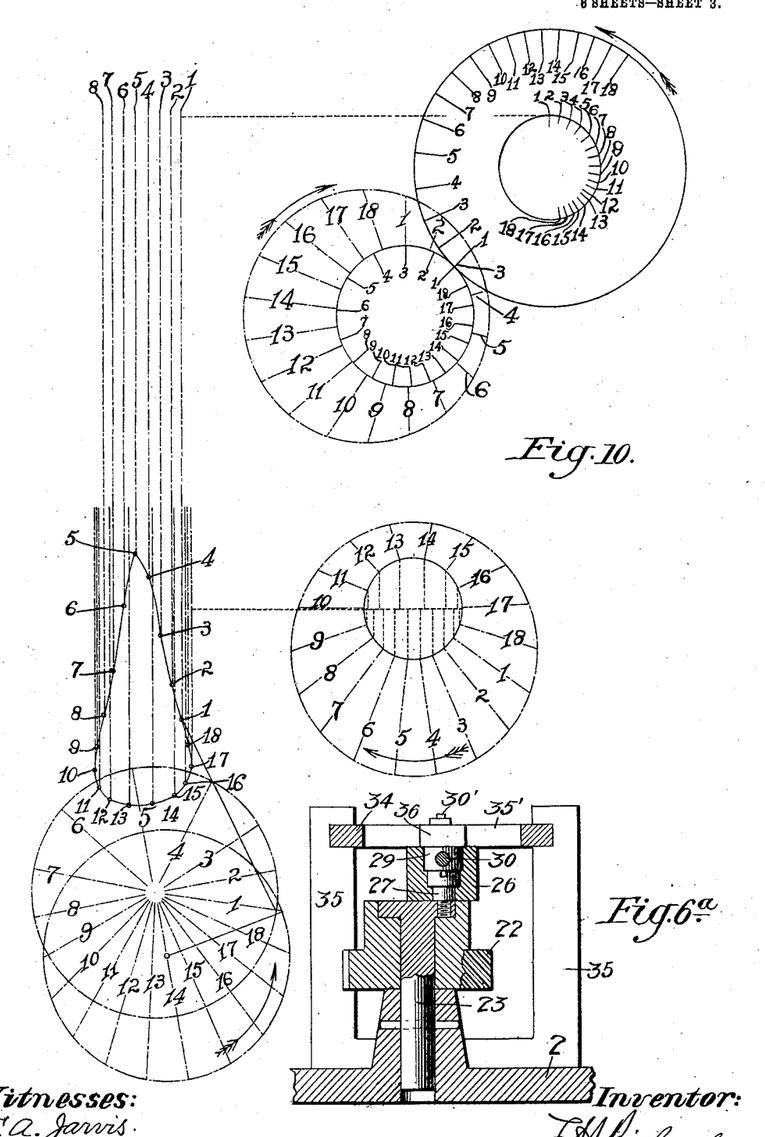
Figure 9:
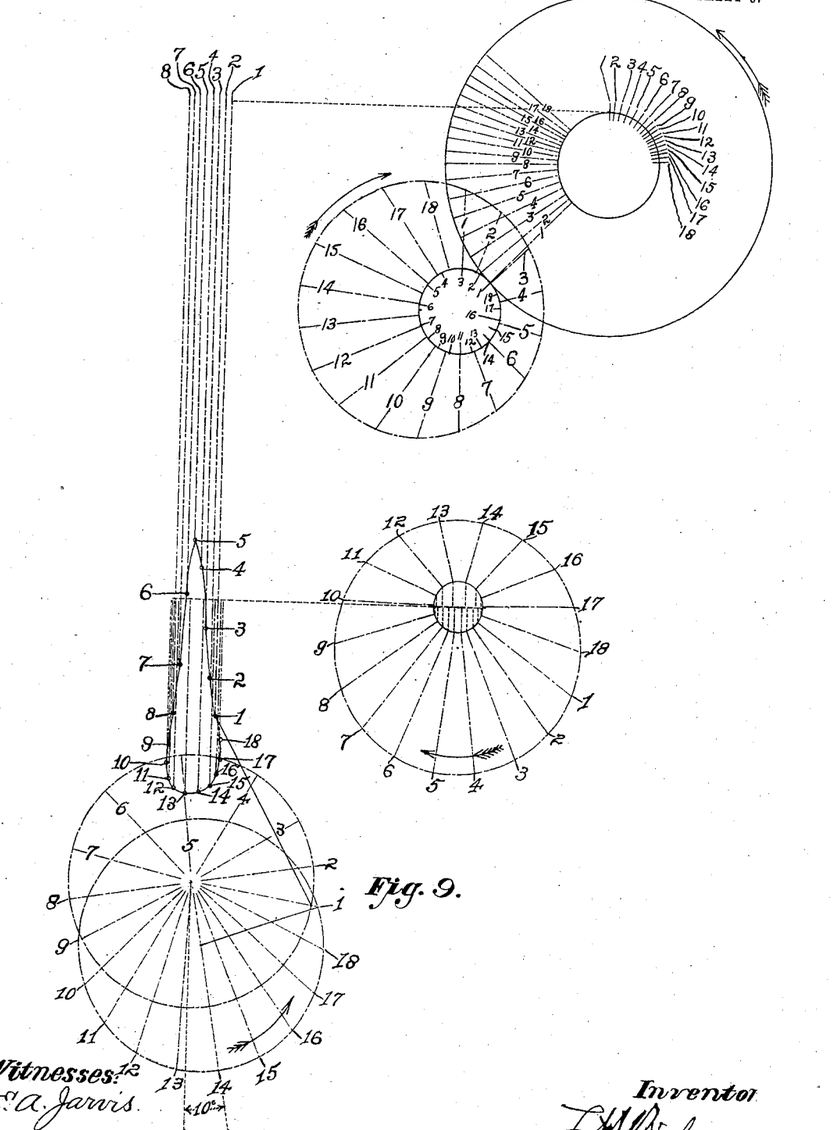
Fig. 9, a diagram of the movements of the several parts in the operation of the illustrated device, indicating by numerals the successive positions of the several parts during the operation of the device, and Fig. 10, a similar diagram showing the operation of the device as altered by the application of change gear and adjustment to alter the distance of the feed.

The diagram of Fig. 9 represents at the upper portion the travel of the belt 17 and the motion of the members which impart to it its continuous variable linear motion which may be regarded as corresponding to the feed of some mechanisms, and at the lower portion the path of travel of the pointer and the motion of the members for giving it variable reciprocations in each of two transverse directions the resultant of which in the proportions and timing illustrated is the path of travel delineated. The path of travel of the pointer from the point 1 to the point 5 will be transversely across the belt and traveling with it during its travel from the point 1 to the point 5 of its path of travel, and during the path of travel of the pointer from the point 5 to the point 8 it will be returning across the belt in a reverse direction but over the same line relative to the belt which it traced in its advance, and during the travel of the belt from the point 5 to the point 8. In Fig. 10 similar motions are delineated but with different relative timing of feed or travel of the belt and coincident lateral reciprocation of the pointer, due to a change of gearing. The application of the diagram of Fig. 8 is seen in the lower left hand corner of Figs. 9 and 10.

It is obvious that the principle involved in this invention may be applied in numerous ways for the accomplishment of a variety of results without departing from the spirit of my invention, and the form shown is merely illustrative of the application of said principle to one of many organizations. I have seen fit to use two of the variable transmitters to effect the result but one from which both movements may be taken may be used. The employment of one or two however will be governed by the exigencies of the particular case. I also desire to use these movements in connection and combination with devices such as shown or such other devices as may be applicable therewith.

Having described my invention, I claim—

1. The combination with mechanism for converting the uniform angular motion of a driver into a variable angular motion, of means for transforming said variable angular motion into a continuous linear motion, a member actuated thereby, a carrier, a reciprocative member mounted on the carrier to move transversely to the line of movement thereof, means for driving said carrier for a portion of its travel with a linear velocity equal to the concurrent tangential velocity of the said member due to the operation of said converting mechanism, and a variable movement mechanism for actuating said reciprocative member with augmented speed during the equal velocity of said carrier and member.

2. The combination with a pair of eccentrically mounted crank arms connected together for converting the uniform angular motion of a driver into a variable angular motion, and means for transforming the variable angular motion into a continuous linear motion, of a reciprocative carrier, a pair of eccentrically mounted crank arms connected together for actuating said carrier, said eccentrically mounted crank arms for actuating the reciprocative carrier passing through their point of minimum leverage during the backward movement of the member, a reciprocative member mounted on the carrier, and a pair of eccentrically mounted crank arms connected together, a crank fast with one of said crank arms and linked to the said reciprocative member, said latter eccentrically mounted crank arms passing through their point of greatest throw during the forward movement of said reciprocative member.

3. In a mechanical movement, the combination of a driving member, an advancing member, a speed-varying connection between said driving and said advancing members, an advancing and retreating member, a speed-varying connection between said driving and said advancing and retreating members, said speed-varying connections organized to effect coincidence of movement between said advancing member and said advancing and retreating member during an appreciable period in the advance of said advancing and retreating member, a reciprocatable member mounted upon and to reciprocate transversely of said advancing and retreating member, and a speed-varying connection between said reciprocatable member and said driving member constructed and adapted for effecting an advance and return of said reciprocatable member across said advancing member during said coincidence of movement between said advancing and said advancing and retreating members at higher velocities than the movement of said reciprocatable member during the remainder of its movement.

4. In a mechanical movement, the combination of a driving member, an advancing member, a speed-varying connection between said driving and said advancing members, an advancing and retreating member, a speed-varying connection between said driving and said advancing and retreating members constructed and adapted for effecting coincidence of movement between said advancing member and said advancing and retreating member during an appreciable period in the advance of said advancing and retreating member, a reciprocatable member mounted upon and to reciprocate transversely of said advancing and retreating member and a crank driven from said driving member and having its axis located in advance of the center of reciprocation of said advancing and retreating member and linked to said reciprocatable member to effect a relatively slow advance and quick return of said reciprocatable member across said advancing member during the coincidence of movement between said advancing and said advancing and retreating members.

5. In a mechanical movement, the combination of a driving member, an advancing member, a speed-varying connection between said driving and said advancing members, an advancing and retreating member, a speed-varying connection between said driving and said advancing and retreating members, a reciprocatable member mounted upon and to reciprocate transversely of said advancing and retreating member and a crank driven from said driving member through a speed-varying connection and having its axis located in advance of the center of reciprocation of said advancing and retreating member for effecting a relatively slow advance and quick return of said reciprocatable member across said advancing member during the coincidence of movement between said advancing and said advancing and retreating members at higher velocities than the movement of said reciprocatable member during the remainder of its movement.

6. The combination with a member and means for imparting thereto a continuous variable linear motion, of a pair of members reciprocatory in transverse directions, and eccentrically mounted crank arms for reciprocating each of said reciprocative members with variable motion.

7. The combination with eccentrically mounted crank arms for converting the uniform angular motion of a driver into a variable angular motion and means for transferring the variable angular motion into a continuous variable linear motion, of a pair of members reciprocatory in transverse directions, and eccentrically mounted crank arms for actuating each of said reciprocative members and passing through their points of minimum leverage respectively during the backward movements of the respective members.

8. The combination with a member and means for imparting thereto variable angular motion, of a carriage and means for reciprocating the same for a portion of its forward travel with a linear velocity equal to the concurrent tangential velocity of said member, a device co-operative with said member, and a slide carrying said device and mounted on said carriage for reciprocation transversely thereof, and means for so reciprocating said slide with augmented speed during the forward travel of said carriage.

9. In a mechanical movement, the combination with a member and mechanism for imparting to said member a continuous variable linear motion, of a carriage reciprocatory in a parallel path and means for imparting thereto continuous variable reciprocations, its reciprocations which are coincident in direction being co-incident in speed, a tool co-operative with said member, a slide carrying said tool and reciprocatory transversely on said carriage, and means for reciprocating said slide with variable intermittent motion with its fastest speed during the said co-incidence of speed and motion of said carriage and member.

FRANCIS H. RICHARDS.

Witnesses:
JOHN O. SEIFERT,
MARCUS C. HOPKINS.